US008363611B2

(12) United States Patent
Ho et al.

(10) Patent No.: US 8,363,611 B2
(45) Date of Patent: Jan. 29, 2013

(54) SEMI-PERSISTENT SCHEDULING RESOURCE RELEASE WITH DRX COMMAND

(75) Inventors: Sai Yiu Duncan Ho, San Diego, CA (US); Wanshi Chen, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 406 days.

(21) Appl. No.: 12/683,394

(22) Filed: Jan. 6, 2010

(65) Prior Publication Data

US 2010/0172313 A1 Jul. 8, 2010

Related U.S. Application Data

(60) Provisional application No. 61/143,143, filed on Jan. 7, 2009, provisional application No. 61/144,041, filed on Jan. 12, 2009.

(51) Int. Cl.
*H04W 4/00* (2009.01)
(52) U.S. Cl. .......................... 370/329; 370/314; 370/341
(58) Field of Classification Search .................. 370/311, 370/312, 314, 329, 336, 341; 375/267
See application file for complete search history.

(56) References Cited

U.S. PATENT DOCUMENTS

| 2007/0291728 | A1 | 12/2007 | Dalsgaard et al. | |
| 2009/0207794 | A1* | 8/2009 | Meylan | 370/329 |
| 2010/0054358 | A1* | 3/2010 | Ko et al. | 375/267 |
| 2010/0111026 | A1* | 5/2010 | Hsu | 370/329 |

FOREIGN PATENT DOCUMENTS

WO WO2009102881 8/2009

OTHER PUBLICATIONS

3GPP TS 36.321 V8.4.0, (Dec. 2008) Technical Specification 3rd Generation Partnership Project; Technical Specification Group Radio Access Network; Evolved Universal Terrestrial Radio Access (E-UTRA) Medium Access Control (MAC) protocol specification (Release 8), Jan. 5, 2009, pp. 1-43, XP002578311, p. 17, lines 22-23; p. 17, lines 36-37; p. 18, lines 3-4,6; p. 27, lines 20-23; p. 28, lines 7-15.
Ericsson: "Details of MAC DRX Control" 3GPP Draft; R2-080934, 3rd Generation Partnership Project (3GPP), Mobile Competence Centre; 650, Route Des Lucioles; F-06921 Sophia-Antipolis Cedes; France, vol. RAN WG2, no. Sorrento, Italy; Feb. 4, 2008, XP050138737, paragraph 2.1; p. 1, lines 18-33; p. 2, lines 1-16; table 6.2.1-1.
ETSI MCC: 3GPP Draft; R2-087432_Report_RAN2_63BIS_Prague, 3rd Generation Partnership Project (3GPP), Mobile Competence Centre; 650, Route Des Lucioles ; F-06921 Sophia-Antipolis Cedex ; France, no. Prague, Czech Republic; Nov. 19, 2008, XP050321913, p. 81, line 7.
International Search Report and Written Opinion—PCT/US2010/020386, International Search Authority—European Patent Office—Aug. 27, 2010.
Nokia Corporation et al: "Missing details of semi-permanent scheduling for DL" 3GPP Draft; R2-086582, 3rd Generation Partnership Project (3GPP), Mobile Competence Centre; 650, Route Des Lucioles; F-06921 Sophia-Antipolis Cedex; France, no. Prague, Czech Republic; Nov. 3, 2008, XP050321489, paragraph 2.2.

(Continued)

*Primary Examiner* — Andrew Lai
(74) *Attorney, Agent, or Firm* — Nerri M. Zohn

(57) ABSTRACT

Certain aspects of the present disclosure relate to a technique for releasing semi-persistent scheduling resources and for immediate entering an energy saving mode of operation at a user terminal.

15 Claims, 9 Drawing Sheets

OTHER PUBLICATIONS

Panasonic / RAN WG1: "Draft Reply to LS on SPS explicit release" 3GPP Draft; R1-090497, 3rd Generation Partnership Project (3GPP), Mobile Competence Centre; 650, Route Des Lucioles; F-06921 Sophia-Antipolis Cedex ; France, no. Ljubljana; (Jan. 19, 2009), XP050318389.

Partial International Search Report/Written Opinion—PCT/US2010/020386—International Search Authority EPO—May 10, 2010.

QUALCOMM Europe: "SPS explicit release" 3GPP Draft; R1-090427 Draft CR on SPS Explicit Release, 3rd Generation Partnership Project (3GPP), Mobile Competence Centre; 650, Route Des Lucioles ; F-06921 Sophia-Antipolis Cedex ; France, no. Ljubljana; 2009011, Jan. 19, 2009, XP050318323.

Rim: "PDCCH Validation for Semi-Persistent Scheduling Release" 3GPP Draft; R1-090024, 3rd Generation Partnership Project (3GPP), Mobile Competence Centre; 650, Route Des Lucioles; F-06921 Sophia-Antipolis Cedex; France, no. Ljubljana; (Jan. 8, 2009), XP050317972.

* cited by examiner

|  | DCI format 0 | DCI format 1/1A | DCI format 2/2A/2B |
|---|---|---|---|
| TPC command for scheduled PUSCH | set to '00' | N/A | N/A |
| Cyclic shift DM RS | set to '000' | N/A | N/A |
| Modulation and coding scheme and redundancy version | MSB is set to '0' | N/A | N/A |
| HARQ process number | N/A | FDD: set to '000' TDD: set to '0000' | FDD: set to '000' TDD: set to '0000' |
| Modulation and coding scheme | N/A | MSB is set to '0' | For the enabled transport block: MSB is set to '0' |
| Redundancy version | N/A | set to '00' | For the enabled transport block: set to '00' |

FIG. 6

|  | DCI format 0 | DCI format 1/1A | DCI format 2/2A/2B |
|---|---|---|---|
| TPC command for scheduled PUSCH | set to '11' | N/A | N/A |
| Cyclic shift DM RS | set to '111' | N/A | N/A |
| Modulation and coding scheme and redundancy version | set to '11111' | N/A | N/A |
| HARQ process number | N/A | FDD: set to '111' TDD: set to '1111' | FDD: set to '111' TDD: set to '1111' |
| Modulation and coding scheme | N/A | LSB is set to '1' | For the enabled transport block: LSB is set to '1' |
| Redundancy version | N/A | set to '11' | For the enabled transport block: set to '11' |

FIG. 7

| Value of 'TPC command for PUCCH' | $n^{(1)}_{PUCCH}$ |
|---|---|
| '00' | The first PUCCH resource index configured by the higher layers |
| '01' | The second PUCCH resource index configured by the higher layers |
| '10' | The third PUCCH resource index configured by the higher layers |
| '11' | The fourth PUCCH resource index configured by the higher layers |

FIG. 8

| | DCI format 0 | DCI format 1/1A | DCI format 2/2A/2B |
|---|---|---|---|
| Hopping Flag | 0 or 1 | N/A | N/A |
| TPC command for scheduled PUSCH | set to '11' | N/A | N/A |
| Cyclic shift DM RS | set to '111' | N/A | N/A |
| Modulation and coding scheme and redundancy version | set to '11111' | N/A | N/A |
| LVRB/DVRB | N/A | 0 or 1 | 0 or 1 |
| HARQ process number | N/A | FDD: set to '111' TDD: set to '1111' | FDD: set to '111' TDD: set to '1111' |
| Modulation and coding scheme | N/A | '11111' | '11111' |
| Redundancy version | N/A | set to '11' | For the enabled transport block: set to '11' |

FIG. 9

SEMI-PERSISTENT SCHEDULING RESOURCE RELEASE WITH DRX COMMAND

CLAIM OF PRIORITY UNDER 35 U.S.C. §119

The present application for patent claims benefit of Provisional Application Ser. No. 61/143,143 filed Jan. 7, 2009 and Provisional Application Ser. No. 61/144,041 filed Jan. 12, 2009, and assigned to the assignee hereof and hereby expressly incorporated by reference herein.

BACKGROUND

1. Field

Certain aspects of the present disclosure generally relate to wireless communications and, more particularly, to a method for releasing downlink and/or uplink semi-persistent scheduling resources at a user terminal accompanied with switching to an energy saving mode of operation.

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, $3^{rd}$ Generation Partnership Project (3GPP) Long Term Evolution (LTE) systems, and Orthogonal Frequency Division Multiple Access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

In the 3GPP LTE systems, an access point can explicitly release downlink (DL) and/or uplink (UL) semi-persistent scheduling (SPS) resources utilizing a Physical Downlink Control Channel (PDCCH) message, which is not associated with any Physical Downlink Shared Channel (PDSCH) transmission and any Physical Uplink Shared Channel (PUSCH) transmission. The access point typically releases the DL and/or UL SPS resources because it does not expect for a while more DL and/or UL data to be transmitted to and/or from a user terminal. Therefore, it can be beneficial that the access point also commands the user terminal to enter an energy saving mode of operation, such as a Discontinuous Reception (DRX) mode in order to save its battery power.

SUMMARY

Certain aspects provide a method for wireless communications. The method generally includes transmitting a message over a Physical Downlink Control Channel (PDCCH), the message comprising a command for releasing semi-persistent scheduling (SPS) resources, indicating, in the message, that a Physical Downlink Shared Channel (PDSCH) transmission is associated with the transmission of the message, and including, in the PDSCH transmission, another command for switching to a Discontinuous Reception (DRX) mode of operation.

Certain aspects provide an apparatus for wireless communications. The apparatus generally includes a transmitter configured to transmit a message over a Physical Downlink Control Channel (PDCCH), the message comprising a command for releasing semi-persistent scheduling (SPS) resources, a circuit configured to indicate, in the message, that a Physical Downlink Shared Channel (PDSCH) transmission is associated with the transmission of the message, and another circuit configured to include, in the PDSCH transmission, another command for switching to a Discontinuous Reception (DRX) mode of operation.

Certain aspects provide an apparatus for wireless communications. The apparatus generally includes means for transmitting a message over a Physical Downlink Control Channel (PDCCH), the message comprising a command for releasing semi-persistent scheduling (SPS) resources, means for indicating, in the message, that a Physical Downlink Shared Channel (PDSCH) transmission is associated with the transmission of the message, and means for including, in the PDSCH transmission, another command for switching to a Discontinuous Reception (DRX) mode of operation.

Certain aspects provide a computer-program product for wireless communications comprising a computer readable medium having instructions stored thereon, the instructions being executable by one or more processors. The instructions generally include instructions for transmitting a message over a Physical Downlink Control Channel (PDCCH), the message comprising a command for releasing semi-persistent scheduling (SPS) resources, instructions for indicating, in the message, that a Physical Downlink Shared Channel (PDSCH) transmission is associated with the transmission of the message, and instructions for including, in the PDSCH transmission, another command for switching to a Discontinuous Reception (DRX) mode of operation.

Certain aspects provide an apparatus for wireless communications. The apparatus generally includes at least one processor configured to transmit a message over a Physical Downlink Control Channel (PDCCH), the message comprising a command for releasing semi-persistent scheduling (SPS) resources, indicate, in the message, that a Physical Downlink Shared Channel (PDSCH) transmission is associated with the transmission of the message, and include, in the PDSCH transmission, another command for switching to a Discontinuous Reception (DRX) mode of operation, and a memory coupled to the at least one processor.

Certain aspects provide a method for wireless communications. The method generally includes receiving a message transmitted over a Physical Downlink Control Channel (PDCCH) with an indication that a Physical Downlink Shared Channel (PDSCH) transmission is associated with the message, said PDSCH transmission comprises a command for switching to a Discontinuous Reception (DRX) mode of operation, receiving the PDSCH transmission, releasing semi-persistent scheduling (SPS) resources upon decoding the message, and switching to the DRX mode of operation upon decoding the PDSCH transmission.

Certain aspects provide an apparatus for wireless communications. The apparatus generally includes a receiver configured to receive a message transmitted over a Physical Downlink Control Channel (PDCCH) with an indication that a Physical Downlink Shared Channel (PDSCH) transmission is associated with the message, said PDSCH transmission comprises a command for switching to a Discontinuous Reception (DRX) mode of operation, wherein the receiver is also configured to receive the PDSCH transmission, and the apparatus further comprising a releasing circuit configured to release semi-persistent scheduling (SPS) resources upon decoding the message, and a switching circuit configured to switch to the DRX mode of operation upon decoding the PDSCH transmission.

Certain aspects provide an apparatus for wireless communications. The apparatus generally includes means for receiving a message transmitted over a Physical Downlink Control Channel (PDCCH) with an indication that a Physical Downlink Shared Channel (PDSCH) transmission is associated with the message, said PDSCH transmission comprises a command for switching to a Discontinuous Reception (DRX) mode of operation, means for receiving the PDSCH transmission, means for releasing semi-persistent scheduling (SPS) resources upon decoding the message, and means for switching to the DRX mode of operation upon decoding the PDSCH transmission.

Certain aspects provide a computer-program product for wireless communications comprising a computer readable medium having instructions stored thereon, the instructions being executable by one or more processors. The instructions generally include instructions for receiving a message transmitted over a Physical Downlink Control Channel (PDCCH) with an indication that a Physical Downlink Shared Channel (PDSCH) transmission is associated with the message, said PDSCH transmission comprises a command for switching to a Discontinuous Reception (DRX) mode of operation, instructions for receiving the PDSCH transmission, instructions for releasing semi-persistent scheduling (SPS) resources upon decoding the message, and instructions for switching to the DRX mode of operation upon decoding the PDSCH transmission.

Certain aspects provide an apparatus for wireless communications. The apparatus generally includes at least one processor configured to receive a message transmitted over a Physical Downlink Control Channel (PDCCH) with an indication that a Physical Downlink Shared Channel (PDSCH) transmission is associated with the message, said PDSCH transmission comprises a command for switching to a Discontinuous Reception (DRX) mode of operation, receive the PDSCH transmission, release semi-persistent scheduling (SPS) resources upon decoding the message, and switch to the DRX mode of operation upon decoding the PDSCH transmission, and a memory coupled to the at least one processor.

Certain aspects provide a method for wireless communications. The method generally includes generating a message comprising an indication for releasing semi-persistent scheduling (SPS) resources and another indication for switching to a Discontinuous Reception (DRX) mode of operation after releasing the SPS resources, and transmitting the message over a Physical Downlink Control Channel (PDCCH).

Certain aspects provide an apparatus for wireless communications. The apparatus generally includes a generator configured to generate a message comprising an indication for releasing semi-persistent scheduling (SPS) resources and another indication for switching to a Discontinuous Reception (DRX) mode of operation after releasing the SPS resources, and a transmitter configured to transmit the message over a Physical Downlink Control Channel (PDCCH).

Certain aspects provide an apparatus for wireless communications. The apparatus generally includes means for generating a message comprising an indication for releasing semi-persistent scheduling (SPS) resources and another indication for switching to a Discontinuous Reception (DRX) mode of operation after releasing the SPS resources, and means for transmitting the message over a Physical Downlink Control Channel (PDCCH).

Certain aspects provide a computer-program product for wireless communications comprising a computer readable medium having instructions stored thereon, the instructions being executable by one or more processors. The instructions generally include instructions for generating a message comprising an indication for releasing semi-persistent scheduling (SPS) resources and another indication for switching to a Discontinuous Reception (DRX) mode of operation after releasing the SPS resources, and instructions for transmitting the message over a Physical Downlink Control Channel (PDCCH).

Certain aspects provide an apparatus for wireless communications. The apparatus generally includes at least one processor configured to generate a message comprising an indication for releasing semi-persistent scheduling (SPS) resources and another indication for switching to a Discontinuous Reception (DRX) mode of operation after releasing the SPS resources, and transmit the message over a Physical Downlink Control Channel (PDCCH), and a memory coupled to the at least one processor.

Certain aspects provide a method for wireless communications. The method generally includes receiving a message transmitted over a Physical Downlink Control Channel (PDCCH), the message comprising an indication for releasing semi-persistent scheduling (SPS) resources and another indication for switching to a Discontinuous Reception (DRX) mode of operation after releasing the SPS resources, releasing the SPS resources according to the indication, and switching to the DRX mode of operation according to the other indication.

Certain aspects provide an apparatus for wireless communications. The apparatus generally includes a receiver configured to receive a message transmitted over a Physical Downlink Control Channel (PDCCH), the message comprising an indication for releasing semi-persistent scheduling (SPS) resources and another indication for switching to a Discontinuous Reception (DRX) mode of operation after releasing the SPS resources, a releasing circuit configured to release the SPS resources according to the indication, and a switching circuit configured to switch to the DRX mode of operation according to the other indication.

Certain aspects provide an apparatus for wireless communications. The apparatus generally includes means for receiving a message transmitted over a Physical Downlink Control Channel (PDCCH), the message comprising an indication for releasing semi-persistent scheduling (SPS) resources and another indication for switching to a Discontinuous Reception (DRX) mode of operation after releasing the SPS resources, means for releasing the SPS resources according to the indication, and means for switching to the DRX mode of operation according to the other indication.

Certain aspects provide a computer-program product for wireless communications comprising a computer readable medium having instructions stored thereon, the instructions being executable by one or more processors. The instructions generally include instructions for receiving a message transmitted over a Physical Downlink Control Channel (PDCCH), the message comprising an indication for releasing semi-persistent scheduling (SPS) resources and another indication for switching to a Discontinuous Reception (DRX) mode of operation after releasing the SPS resources, instructions for releasing the SPS resources according to the indication, and instructions for switching to the DRX mode of operation according to the other indication.

Certain aspects provide an apparatus for wireless communications. The apparatus generally includes at least one processor configured to receive a message transmitted over a Physical Downlink Control Channel (PDCCH), the message comprising an indication for releasing semi-persistent scheduling (SPS) resources and another indication for switching to a Discontinuous Reception (DRX) mode of operation after releasing the SPS resources, release the SPS resources according to the indication, and switch to the DRX mode of operation according to the other indication, and a memory coupled to the at least one processor.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 6 illustrates special fields of a Physical Downlink Control Channel (PDCCH) message for validating semi-persistent scheduling activation and reconfiguration in accordance with certain aspects of the present disclosure.

FIG. 7 illustrates special fields of the PDCCH message for validating semi-persistent scheduling release in accordance with certain aspects of the present disclosure.

FIG. 8 illustrates an example of Physical Uplink Control Channel (PUCCH) resource index for downlink semi-persistent scheduling in accordance with certain aspects of the present disclosure.

FIG. 9 illustrates special fields of the PDCCH message for validating semi-persistent scheduling release and entering the energy saving mode of operation in accordance with certain aspects of the present disclosure.

DETAILED DESCRIPTION

Figure 1:
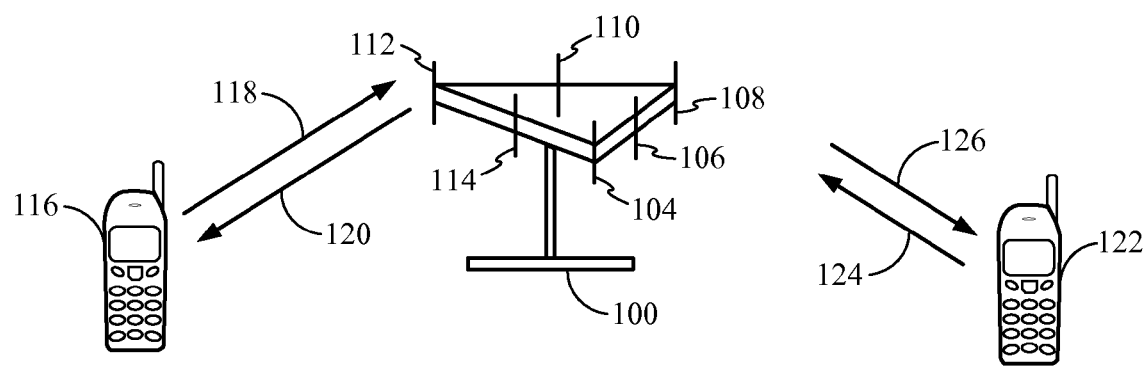
FIG. 1 illustrates an example multiple access wireless communication system in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2).

Single carrier frequency division multiple access (SC-FDMA) is a transmission technique that utilizes single carrier modulation at a transmitter side and frequency domain equalization at a receiver side. The SC-FDMA has similar performance and essentially the same overall complexity as those of OFDMA system. However, SC-FDMA signal has lower peak-to-average power ratio (PAPR) because of its inherent single carrier structure. The SC-FDMA has drawn great attention, especially in the uplink communications where lower PAPR greatly benefits the mobile terminal in terms of transmit power efficiency. It is currently a working assumption for uplink multiple access scheme in the 3GPP LTE and the Evolved UTRA.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects the node is a wireless node. Such wireless node may provide, for example, connectivity for or to a network (e.g., a wide area network such as the Internet or a cellular network) via a wired or wireless communication link.

Referring to FIG. 1, a multiple access wireless communication system according to one aspect is illustrated. An access point 100 (AP) may include multiple antenna groups, one group including antennas 104 and 106, another group including antennas 108 and 110, and an additional group including antennas 112 and 114. In FIG. 1, only two antennas are shown for each antenna group, however, more or fewer antennas may be utilized for each antenna group. Access terminal 116 (AT) may be in communication with antennas 112 and 114, where antennas 112 and 114 transmit information to access terminal 116 over forward link 120 and receive information from access terminal 116 over reverse link 118. Access terminal 122 may be in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In one aspect of the present disclosure each antenna group may be designed to communicate to access terminals in a sector of the areas covered by access point 100.

In communication over forward links 120 and 126, the transmitting antennas of access point 100 may utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

Figure 2:
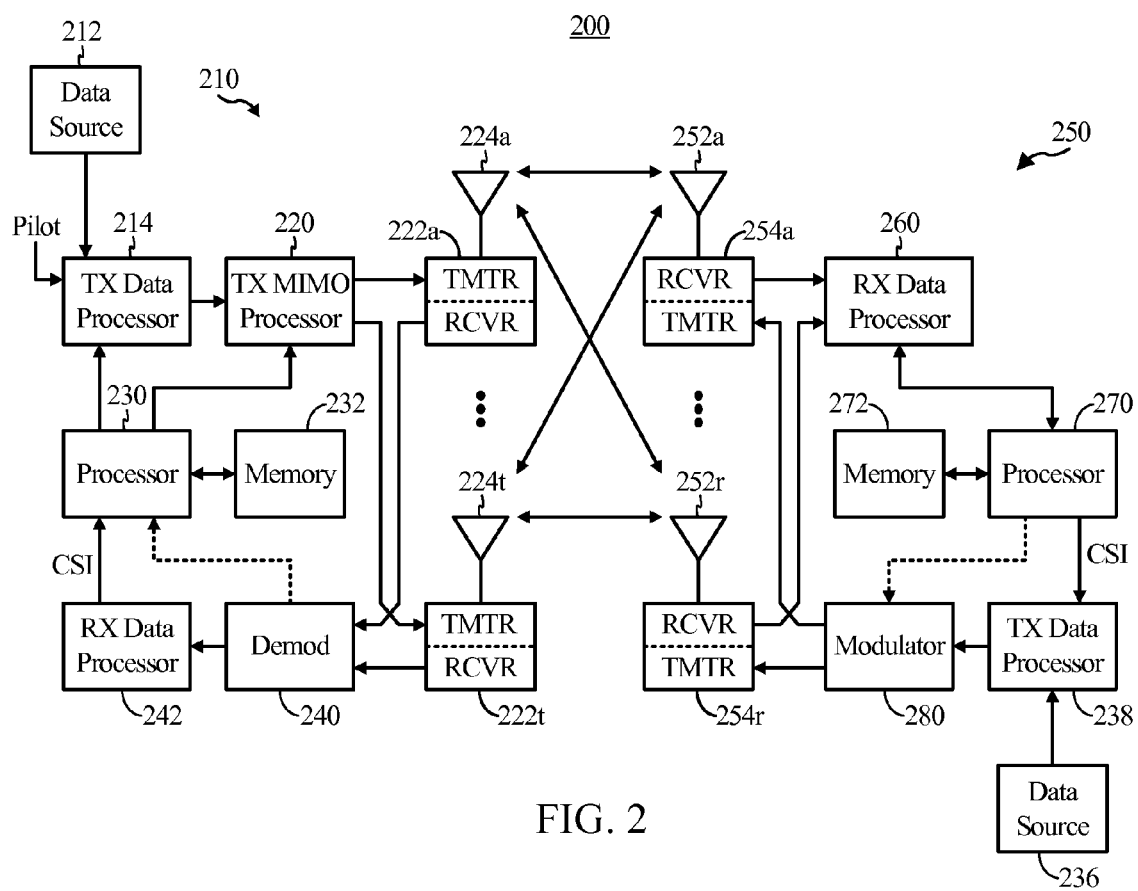
FIG. 2 illustrates a block diagram of an access point and a user terminal in accordance with certain aspects of the present disclosure.

FIG. 2 illustrates a block diagram of an aspect of a transmitter system 210 (also known as the access point) and a receiver system 250 (also known as the access terminal) in a multiple-input multiple-output (MIMO) system 200. At the transmitter system 210, traffic data for a number of data streams is provided from a data source 212 to a transmit (TX) data processor 214.

In one aspect of the present disclosure, each data stream may be transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects of the present disclosure, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals may be received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and further process the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 may be complementary to that performed by TX MIMO processor 220 and TX data processor 214 at transmitter system 210.

A processor 270 periodically determines which pre-coding matrix to use. Processor 270 formulates a reverse link message comprising a matrix index portion and a rank value portion. The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reverse link message transmitted by the receiver system 250. Processor 230 then determines which pre-coding matrix to use for determining the beamforming weights, and then processes the extracted message.

Figure 3:
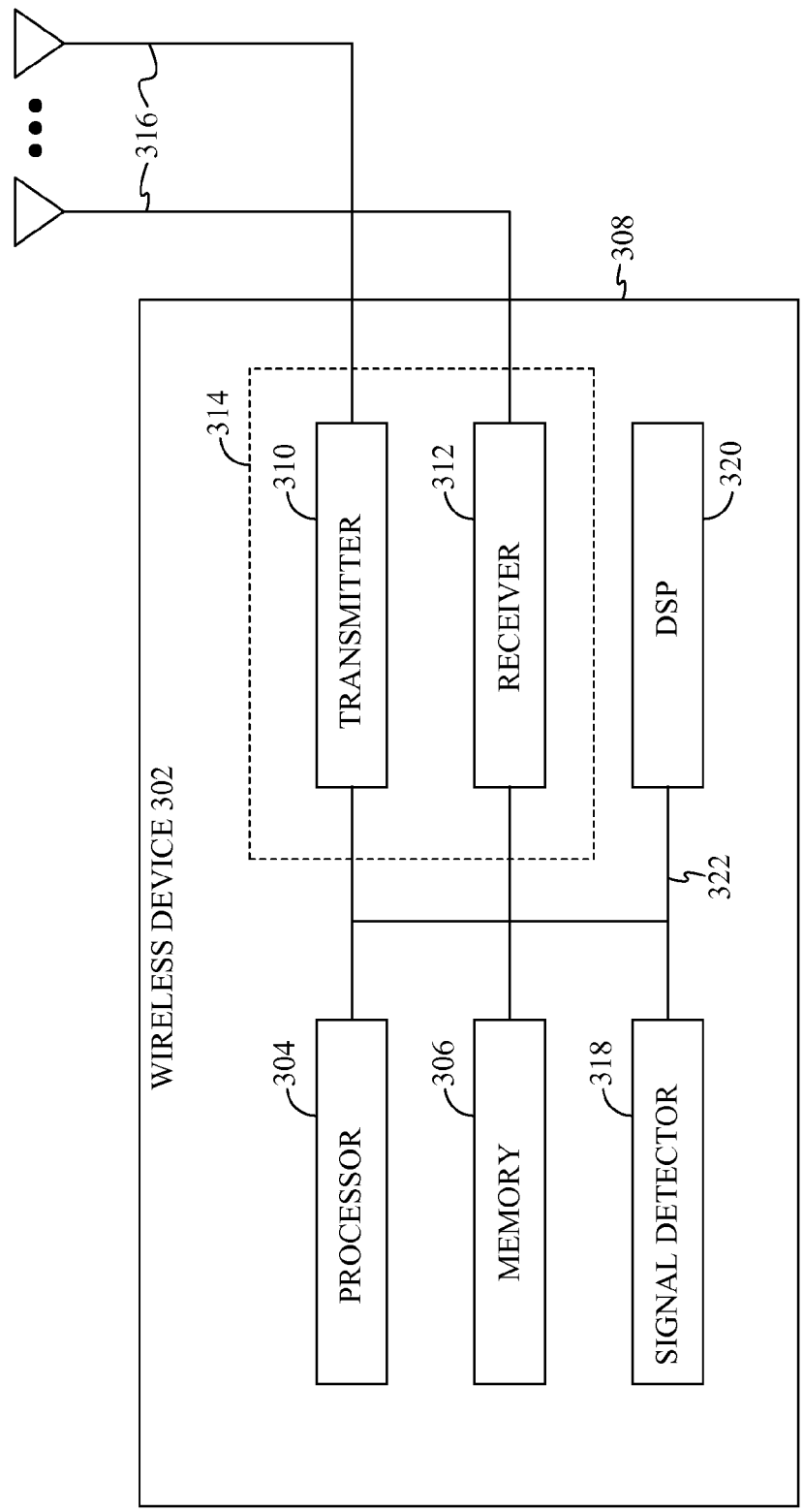
FIG. 3 illustrates various components that may be utilized in a wireless device in accordance with certain aspects of the present disclosure.

FIG. 3 illustrates various components that may be utilized in a wireless device 302 that may be employed within the wireless communication system illustrated in FIG. 1. The wireless device 302 is an example of a device that may be configured to implement the various methods described herein. The wireless device 302 may be a base station 100 or any of user terminals 116 and 122.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

In one aspect of the present disclosure, logical wireless communication channels may be classified into control channels and traffic channels. Logical control channels may comprise a Broadcast Control Channel (BCCH) which is a downlink (DL) channel for broadcasting system control information. A Paging Control Channel (PCCH) is a DL logical control channel that transfers paging information. A Multicast Control Channel (MCCH) is a point-to-multipoint DL logical control channel used for transmitting Multimedia Broadcast and Multicast Service (MBMS) scheduling and control information for one or several Multicast Traffic Channels (MTCHs). Generally, after establishing Radio Resource Control (RRC) connection, the MCCH may be only used by user terminals that receive MBMS. A Dedicated Control Channel (DCCH) is a point-to-point bi-directional logical control channel that transmits dedicated control information and it is used by user terminals having an RRC connection. Logical traffic channels may comprise a Dedicated Traffic Channel (DTCH) which is a point-to-point bi-directional channel dedicated to one user terminal for transferring user information. Furthermore, logical traffic channels may comprise a Multicast Traffic Channel (MTCH), which is a point-to-multipoint DL channel for transmitting traffic data.

Transport channels may be classified into DL and UL channels. DL transport channels may comprise a Broadcast Channel (BCH), a Downlink Shared Data Channel (DL-SDCH) and a Paging Channel (PCH). The PCH may be utilized for supporting power saving at the user terminal (i.e., Discontinuous Reception (DRX) cycle may be indicated to the user terminal by the network), broadcasted over entire cell and mapped to physical layer (PHY) resources which can be used for other control/traffic channels. The UL transport channels may comprise a Random Access Channel (RACH), a Request Channel (REQCH), an Uplink Shared Data Channel (UL-SDCH) and a plurality of PHY channels.

The PHY channels may comprise a set of DL channels and UL channels. The DL PHY channels may comprise: Common Pilot Channel (CPICH), Synchronization Channel (SCH), Common Control Channel (CCCH), Shared DL Control Channel (SDCCH), Multicast Control Channel (MCCH), Shared UL Assignment Channel (SUACH), Acknowledgement Channel (ACKCH), DL Physical Shared Data Channel (DL-PSDCH), UL Power Control Channel (UPCCH), Paging Indicator Channel (PICH), and Load Indicator Channel (LICH). The UL PHY Channels may comprise: Physical Random Access Channel (PRACH), Channel Quality Indicator Channel (CQICH), Acknowledgement Channel (ACKCH), Antenna Subset Indicator Channel (ASICH), Shared Request Channel (SREQCH), UL Physical Shared Data Channel (UL-PSDCH), and Broadband Pilot Channel (BPICH).

In an aspect of the present disclosure, a channel structure may be provided that preserves low PAPR properties of a single carrier waveform. At any given time, the channel may be contiguous or uniformly spaced in frequency.

In the 3GPP LTE systems, such as the wireless system illustrated in FIG. 1, an access point may explicitly command releasing of downlink (DL) semi-persistent scheduling (SPS) resources using a message transmitted over a Physical Downlink Control Channel (PDCCH). The access point usually releases the DL SPS resources because it does not expect for a while more DL data dedicated to a user terminal. Therefore, along to the release of DL SPS resources, the access point may also command the user terminal to enter into an energy saving mode of operation, such as a Discontinuous Reception (DRX) mode to save its battery power.

Furthermore, the access point may explicitly command releasing of uplink (UL) SPS resources using a message transmitted over the PDCCH, which may not be associated with any Physical Uplink Shared Channel (PUSCH) transmission. The access point usually releases the UL SPS resources because it does not expect for a while more UL data to be transmitted from a user terminal. Therefore, along to the release of UL SPS resources, the access point may also command the user terminal to enter into an energy saving mode of operation, such as the DRX mode in order to save its battery power.

The PDCCH message may be associated with a corresponding Physical Downlink Shared Channel (PDSCH) transmission. In one aspect of the present disclosure, the access point may include a "DRX command Media Access Control (MAC) control element" into the PDSCH transmission in order to command the user terminal to immediately enter into the DRX mode after releasing the DL SPS resources.

In another aspect of the present disclosure, a command for switching to the DRX mode of operation may be directly included in the PDCCH message that indicates releasing of DL SPS resources. In yet another aspect, an indication for switching to the DRX mode may be directly included in the PDCCH message that specifies releasing of UL SPS resources.

Semi-Persistent Scheduling Resource Release and Switching to Energy Saving Mode An access point may decide to release a DL SPS resource that has been already assigned to a user terminal. Then, the access point may send a PDCCH message comprising a special code-point indicating "release the DL SPS resource". However, there may be no corresponding DL PDSCH transmission associated with the transmitted PDCCH message. Therefore, neither MAC control element nor user data can be sent to the user terminal along with the PDCCH message.

The user terminal may receive and release the DL SPS resource according to the decoded PDCCH message. The user terminal may then wait until a corresponding timer expires in order to enter the DRX mode of operation. Alternatively, the access point may send a DRX command to force the user terminal to switch into the DRX mode. However, this approach may require a separate PDCCH+PDSCH transmission.

In one aspect of the present disclosure, the access point may send a PDCCH message with a code-point indicating "release DL SPS resource and decode DL PDSCH for user data". The access point may include a DRX command (i.e., a MAC control element) in the associated PDSCH transmission. The user terminal may decode the PDCCH message and release the DL SPS resource accordingly. In addition, the user terminal may decode the DL PDSCH transmission as indicated in the PDCCH message. Once the user terminal decodes the PDSCH transmission, it may detect the DRX command and immediately enter the DRX mode.

When the access point decides to release the DL SPS resource, there may be no more DL data for a while dedicated for the user terminal. Therefore, it is beneficial for the user terminal to immediately switch into the DRX mode in order to save its battery power. By employing the proposed approach, one PDCCH+PDSCH transmission may be saved and the user terminal battery power may be better preserved. Moreover, this PDSCH may require multiple transmissions for successful delivery (Hybrid Automatic Repeat Request (HARQ) mode). Therefore, more PDSCH transmissions may be saved.

Figure 4:
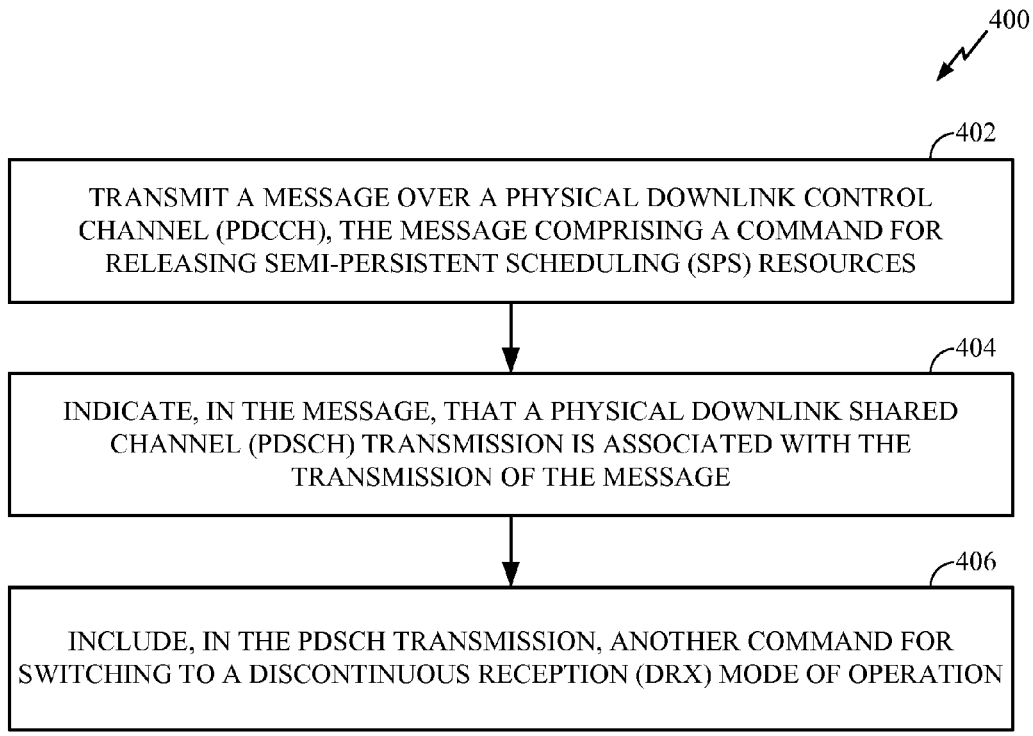
FIG. 4 illustrates example operations that may be executed at an access point for commanding a user terminal to release downlink semi-persistent scheduling (SPS) resources and to enter an energy saving mode of operation in accordance with certain aspects of the present disclosure.
Figure 4A:
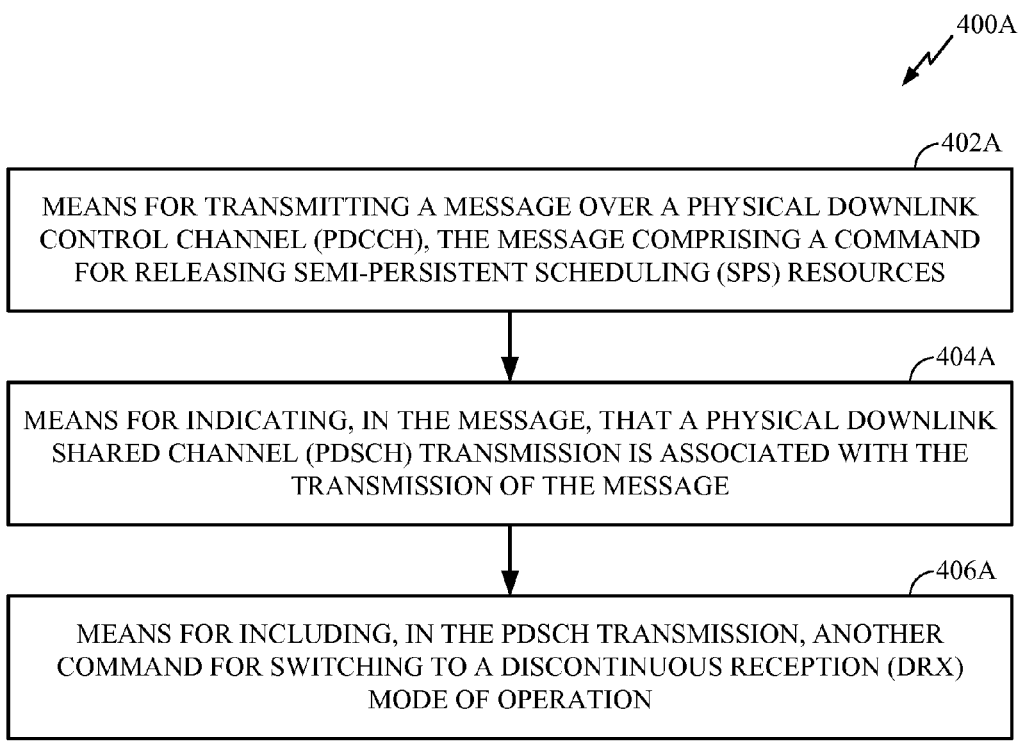
FIG. 4A illustrates example components capable of performing the operations illustrated in FIG. 4.

FIG. 4 illustrates example operations 400 that may be executed at the access point for commanding the user terminal to release the DL SPS resources and to enter an energy saving mode of operation (e.g., the DRX mode) in accordance with certain aspects of the present disclosure. At 402, the access point may transmit a message over a PDCCH, the message comprising a command for releasing the DL SPS resources. At 404, the access point may indicate, in the message, that a PDSCH transmission is associated with the transmission of the message. At 406, another command for switching to the DRX mode of operation may be included in the PDSCH transmission.

Figure 5:
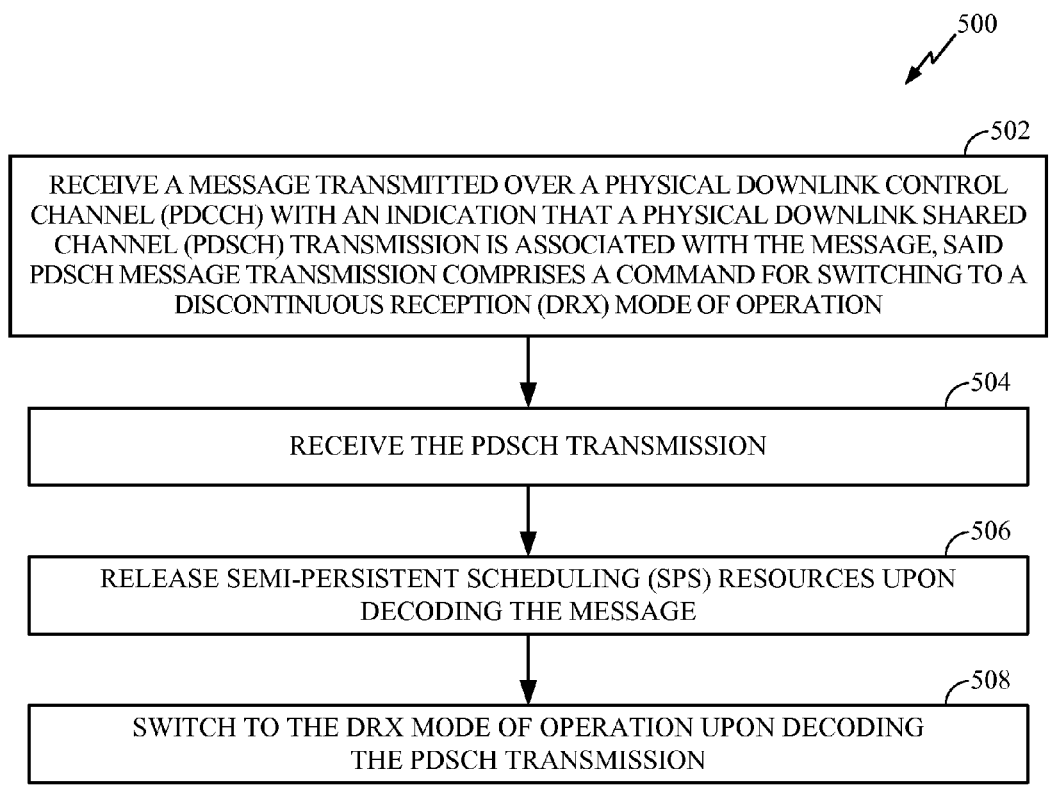
FIG. 5 illustrates example operations that may be executed at the user terminal for releasing the downlink SPS resources and entering the energy saving mode of operation in accordance with certain aspects of the present disclosure.
Figure 5A:
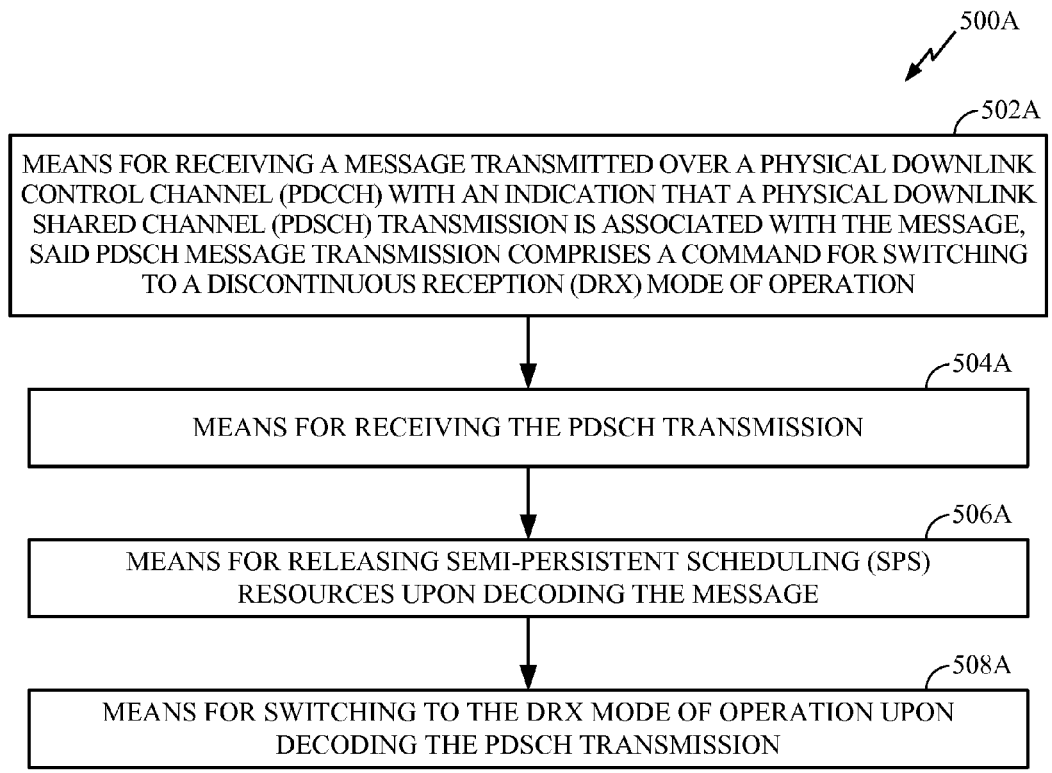
FIG. 5A illustrates example components capable of performing the operations illustrated in FIG. 5.

FIG. 5 illustrates example operations 500 that may be executed at the user terminal for releasing the DL SPS resources and entering the energy saving mode of operation (e.g., the DRX mode) in accordance with certain aspects of the present disclosure. At 502, the user terminal may receive a message transmitted over the PDCCH with an indication that a PDSCH transmission is associated with the message, said PDSCH transmission comprises a command for switching to the DRX mode of operation. At 504, the user terminal may receive the PDSCH transmission. At 506, the user terminal may release the DL SPS resources upon decoding the message. At 508, the user terminal may switch to the DRX mode of operation upon decoding the PDSCH transmission.

FIG. 6 illustrates special fields of a Physical Downlink Control Channel (PDCCH) message 600 for validating semi-persistent scheduling activation and reconfiguration in accordance with certain aspects of the present disclosure. For different Downlink Control Information (DCI) formats, values of a Transmission Power Control (TPC) field, a cyclic shift Demodulation Reference Signal (DM-RS) field, a Modulation Coding Scheme (MCS) field, a Redundancy Version (RV) field and a HARQ field may be set as given in FIG. 6.

FIG. 7 illustrates special fields of the PDCCH message 700 for validating semi-persistent scheduling release in accordance with certain aspects of the present disclosure. To differentiate the explicit semi-persistent scheduling release mechanism from the semi-persistent scheduling activation (see FIG. 6), the fields for virtual Cyclic Redundancy Check (CRC) may be set to all ones, as illustrated in FIG. 7. For uplink semi-persistent scheduling release, the TPC field, the cyclic shift DM-RS field and the MCS field of the PDCCH message may be set to all ones (total of 10 bits), as illustrated in FIG. 7. The MCS field equal to '11111' may indicate a null Physical Uplink Shared Channel (PUSCH) assignment. For downlink semi-persistent scheduling release, the HARQ field, the RV field, and a least significant bit (LSB) of the MCS field may be set to all ones (total of 7 to 8 bits). Non-null PDSCH assignment may be possible for the downlink semi-persistent scheduling release.

The user terminal may validate received DCI formats 0, 1, 1A, 2, 2A, 2B (i.e., the DCI formats specified in the LTE Release-9) for which a CRC may be scrambled by a SPS C-RNTI and where a new data indicator field (in case of DCI formats 2 and 2A for the enabled transport block) may be set to '0'. It may be required to verify that all conditions for the respectively utilized DCI formats according to FIG. 6 for semi-persistent scheduling activation and reconfiguration and according to FIG. 7 for semi-persistent scheduling release are met. In case not all of these conditions are met, the received DCI format may be considered by the user terminal as being received with a non-matching CRC.

In the case of validation, the user terminal may consider the received DCI information as a valid semi-persistent assignment/grant. In addition, for the case when the DCI format indicates a downlink assignment for semi-persistent scheduling activation and reconfiguration, a "TPC command for Physical Uplink Control Channel (PUCCH)" field may be utilized as an index to one of the four PUCCH resource indices configured by higher layers. The mapping of PUCCH resource indices 800 is defined in FIG. 8.

In another aspect of the present disclosure, a PDCCH message that indicates releasing of SPS resources may also comprise an indication for switching to the DRX mode. FIG. 9 illustrates special fields of the PDCCH message 900 for validating semi-persistent scheduling release and entering the energy saving mode of operation in accordance with certain aspects of the present disclosure. For uplink semi-persistent scheduling release, the TPC field, the DM-RS field and the MCS field may be set to all ones (total of 10 bits), as illustrated in FIG. 9. The MCS field equal to '11111' may indicate null PUSCH assignment, while one bit (e.g., an uplink hopping bit) may indicate switching to the DRX mode. For downlink semi-persistent scheduling release, the HARQ field, the RV field, and the LSB of the MCS field of the PDCCH message may be set to all ones (total of 7 to 8 bits). One bit (e.g., a Localized Virtual Resource Block (LVRB)/Distributed Virtual Resource Block (DVRB) hopping bit) of the PDCCH message may indicate switching to the DRX mode.

Figure 10:
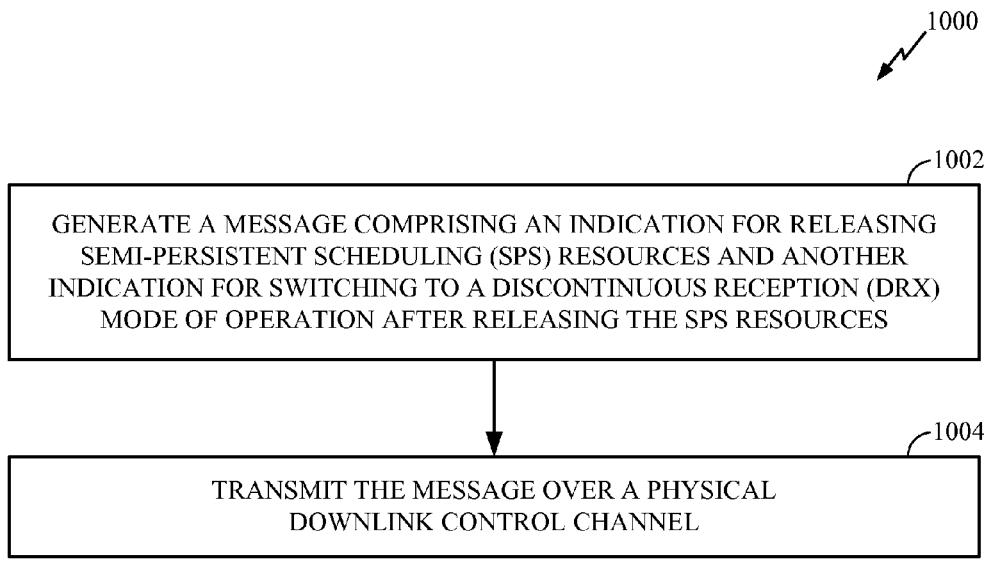
FIG. 10 illustrates other example operations that may be executed at the access point for commanding the user terminal to release SPS resources and to enter the energy saving mode of operation in accordance with certain aspects of the present disclosure.
Figure 10A:
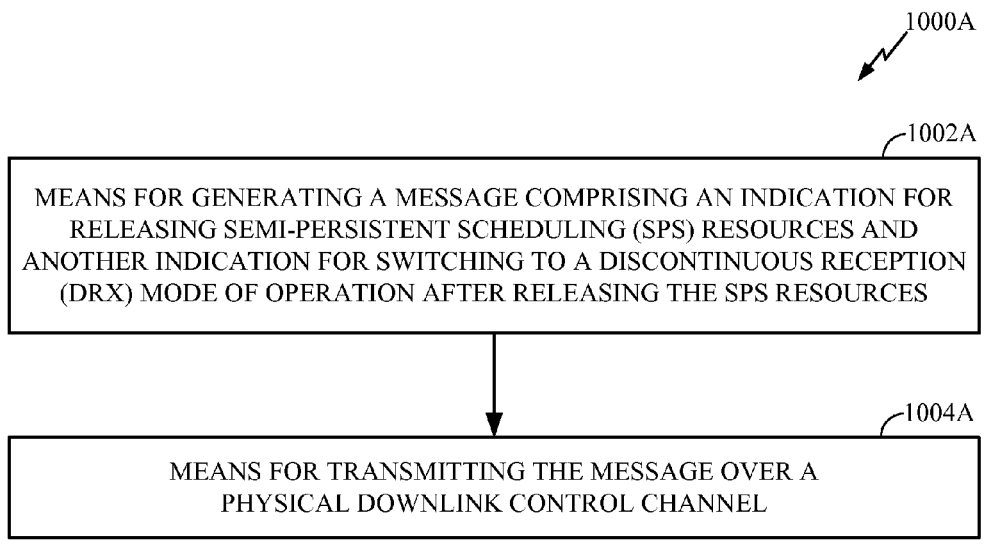
FIG. 10A illustrates example components capable of performing the operations illustrated in FIG. 10.

FIG. 10 illustrates example operations 1000 that may be executed at the access point for commanding the user terminal to release the SPS resources and to enter the energy saving mode of operation (e.g., the DRX mode) in accordance with certain aspects of the present disclosure. At 1002, a message comprising an indication for releasing the SPS resources and another indication for switching to the DRX mode of operation after releasing the SPS resources may be generated at the access point. At 1004, the access point may transmit the message over the PDCCH.

Figure 11:
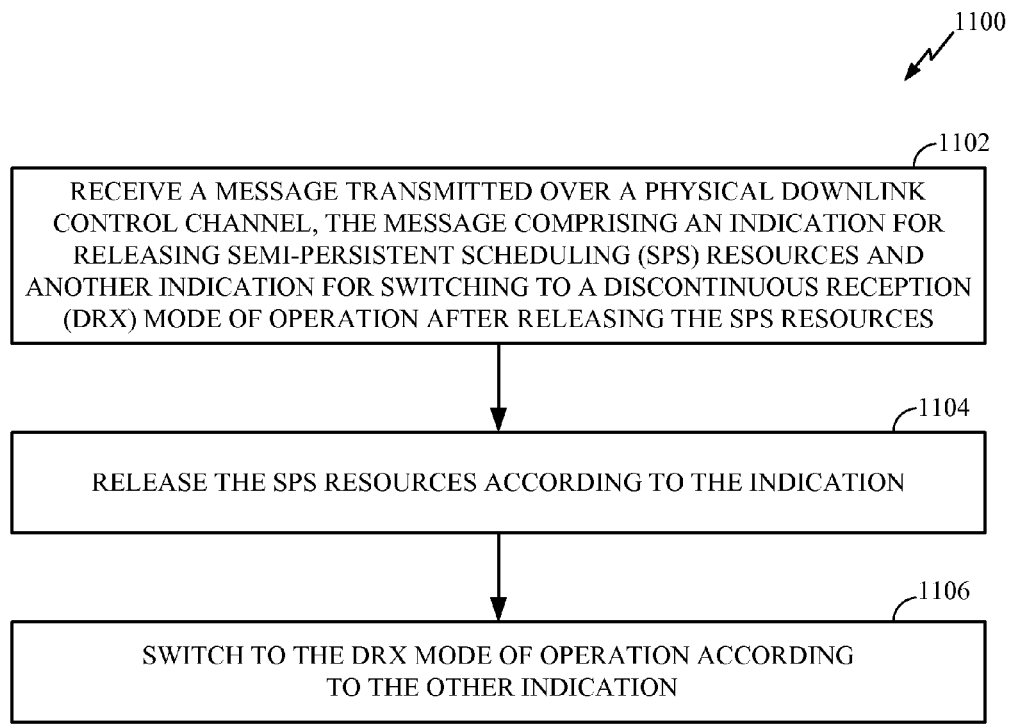
FIG. 11 illustrates other example operations that may be executed at the user terminal for releasing the SPS resources and entering the energy saving mode of operation in accordance with certain aspects of the present disclosure.
Figure 11A:
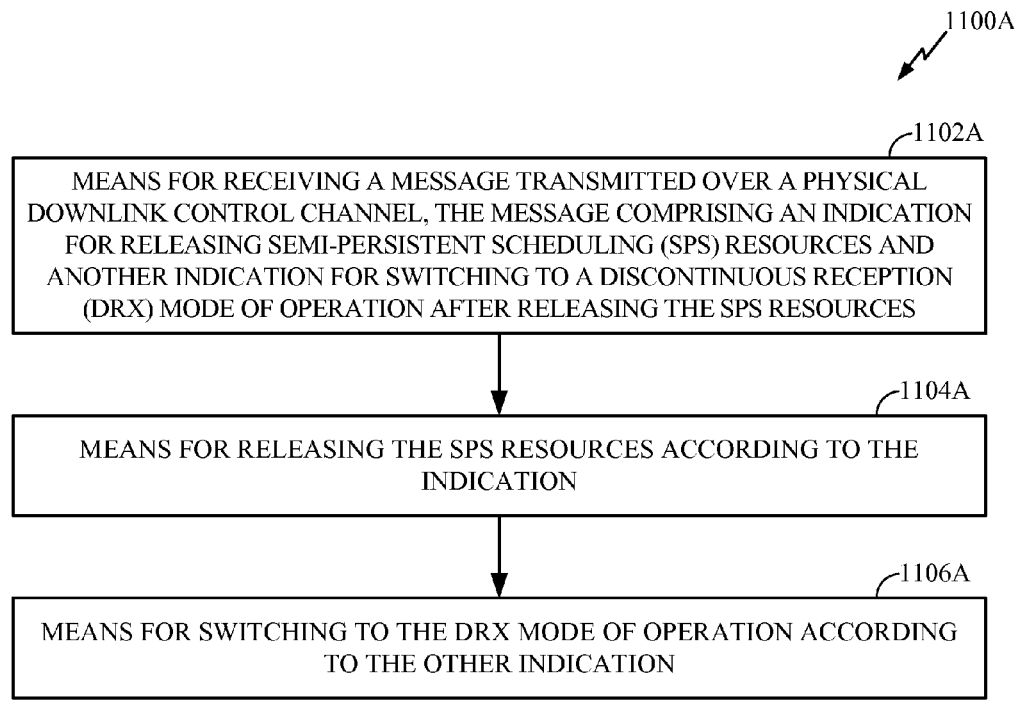
FIG. 11A illustrates example components capable of performing the operations illustrated in FIG. 11.

FIG. 11 illustrates example operations 1100 that may be executed at the user terminal for releasing the SPS resources and entering the energy saving mode of operation in accordance with certain aspects of the present disclosure. At 1102, the user terminal may receive a message transmitted over the PDCCH, the message comprising an indication for releasing the SPS resources and another indication for switching to the DRX mode of operation after releasing the SPS resources. At 1104, the user terminal may release the SPS resources according to the indication. At 1106, the user terminal may switch to the DRX mode of operation according to the other indication.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, operations 400, 500, 1000 and 1100, illustrated in FIGS. 4, 5, 10 and 11 correspond to components 400A, 500A, 1000A and 1100A illustrated in FIGS. 4A, 5A, 10A and 11A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of a list of" items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The invention claimed is:

1. A method for wireless communications, comprising:
generating a message comprising an indication for releasing semi-persistent scheduling (SPS) resources and another indication for switching to a Discontinuous Reception (DRX) mode of operation after releasing the SPS resources; and
transmitting the message over a Physical Downlink Control Channel (PDCCH),
wherein:
a Localized Virtual Resource Block (LVRB)/Distributed Virtual Resource Block (DVRB) hopping bit of the message indicates switching to the DRX mode of operation, and
the released SPS resources comprise downlink SPS resources.

2. An apparatus for wireless communications, comprising:
a generator configured to generate a message comprising an indication for releasing semi-persistent scheduling (SPS) resources and another indication for switching to a Discontinuous Reception (DRX) mode of operation after releasing the SPS resources; and
a transmitter configured to transmit the message over a Physical Downlink Control Channel (PDCCH),
wherein:
a Localized Virtual Resource Block (LVRB)/Distributed Virtual Resource Block (DVRB) hopping bit of the message indicates switching to the DRX mode of operation, and
the released SPS resources comprise downlink SPS resources.

3. An apparatus for wireless communications, comprising:
means for generating a message comprising an indication for releasing semi-persistent scheduling (SPS) resources and another indication for switching to a Discontinuous Reception (DRX) mode of operation after releasing the SPS resources; and
means for transmitting the message over a Physical Downlink Control Channel (PDCCH),
wherein:
a Localized Virtual Resource Block (LVRB)/Distributed Virtual Resource Block (DVRB) hopping bit of the message indicates switching to the DRX mode of operation, and
the released SPS resources comprise downlink SPS resources.

4. A computer-program product for wireless communications, comprising a non-transitory computer readable medium having instructions stored thereon, the instructions being executable by one or more processors and the instructions comprising:
instructions for generating a message comprising an indication for releasing semi-persistent scheduling (SPS) resources and another indication for switching to a Discontinuous Reception (DRX) mode of operation after releasing the SPS resources; and
instructions for transmitting the message over a Physical Downlink Control Channel (PDCCH),
wherein:
a Localized Virtual Resource Block (LVRB)/Distributed Virtual Resource Block (DVRB) hopping bit of the message indicates switching to the DRX mode of operation, and
the released SPS resources comprise downlink SPS resources.

5. An apparatus for wireless communications, comprising:
at least one processor configured to
generate a message comprising an indication for releasing semi-persistent scheduling (SPS) resources and another indication for switching to a Discontinuous Reception (DRX) mode of operation after releasing the SPS resources, and transmit the message over a Physical Downlink Control Channel (PDCCH), wherein:

a Localized Virtual Resource Block (LVRB)/Distributed Virtual Resource Block (DVRB) hopping bit of the message indicates switching to the DRX mode of operation, and the released SPS resources comprise downlink SPS resources; and a memory coupled to the at least one processor.

6. A method for wireless communications, comprising:

receiving a message transmitted over a Physical Downlink Control Channel (PDCCH), the message comprising an indication for releasing semi-persistent scheduling (SPS) resources and another indication for switching to a Discontinuous Reception (DRX) mode of operation after releasing the SPS resources;

releasing the SPS resources according to the indication; and switching to the DRX mode of operation according to the other indication, wherein a Localized Virtual Resource Block (LVRB)/Distributed Virtual Resource Block (DVRB) hopping bit of the message indicates switching to the DRX mode of operation, and the released SPS resources comprise downlink SPS resources.

7. The method of claim 6, wherein switching to the DRX mode is performed immediately after releasing the SPS resources.

8. An apparatus for wireless communications, comprising:

a receiver configured to receive a message transmitted over a Physical Downlink Control Channel (PDCCH), the message comprising an indication for releasing semi-persistent scheduling (SPS) resources and another indication for switching to a Discontinuous Reception (DRX) mode of operation after releasing the SPS resources;

a releasing circuit configured to release the SPS resources according to the indication; and a switching circuit configured to switch to the DRX mode of operation according to the other indication, wherein a Localized Virtual Resource Block (LVRB)/Distributed Virtual Resource Block (DVRB) hopping bit of the message indicates switching to the DRX mode of operation, and the released SPS resources comprise downlink SPS resources.

9. The apparatus of claim 8, wherein the switching circuit is also configured to switch to the DRX mode immediately after releasing the SPS resources.

10. An apparatus for wireless communications, comprising:

means for receiving a message transmitted over a Physical Downlink Control Channel (PDCCH), the message comprising an indication for releasing semi-persistent scheduling (SPS) resources and another indication for switching to a Discontinuous Reception (DRX) mode of operation after releasing the SPS resources;

means for releasing the SPS resources according to the indication; and means for switching to the DRX mode of operation according to the other indication, wherein a Localized Virtual Resource Block (LVRB)/Distributed Virtual Resource Block (DVRB) hopping bit of the message indicates switching to the DRX mode of operation, and the released SPS resources comprise downlink SPS resources.

11. The apparatus of claim 10, wherein switching to the DRX mode is performed immediately after releasing the SPS resources.

12. A computer-program product for wireless communications, comprising a non-transitory computer readable medium having instructions stored thereon, the instructions being executable by one or more processors and the instructions comprising:

instructions for receiving a message transmitted over a Physical Downlink Control Channel (PDCCH), the message comprising an indication for releasing semi-persistent scheduling (SPS) resources and another indication for switching to a Discontinuous Reception (DRX) mode of operation after releasing the SPS resources;

instructions for releasing the SPS resources according to the indication; and instructions for switching to the DRX mode of operation according to the other indication, wherein a Localized Virtual Resource Block (LVRB)/Distributed Virtual Resource Block (DVRB) hopping bit of the message indicates switching to the DRX mode of operation, and the released SPS resources comprise downlink SPS resources.

13. The computer-program product of claim 12, wherein switching to the DRX mode is performed immediately after releasing the SPS resources.

14. An apparatus for wireless communications, comprising:

at least one processor configured to receive a message transmitted over a Physical Downlink Control Channel (PDCCH), the message comprising an indication for releasing semi-persistent scheduling (SPS) resources and another indication for switching to a Discontinuous Reception (DRX) mode of operation after releasing the SPS resources;

release the SPS resources according to the indication, and switch to the DRX mode of operation according to the other indication, wherein a Localized Virtual Resource Block (LVRB)/Distributed Virtual Resource Block (DVRB) hopping bit of the message indicates switching to the DRX mode of operation, and the released SPS resources comprise downlink SPS resources; and a memory coupled to the at least one processor.

15. The apparatus of claim 14, wherein the processor is further configured to switch to the DRX mode immediately after releasing the SPS resources.

* * * * *